US006845419B1

United States Patent
Moyer

(10) Patent No.: US 6,845,419 B1
(45) Date of Patent: Jan. 18, 2005

(54) FLEXIBLE INTERRUPT CONTROLLER THAT INCLUDES AN INTERRUPT FORCE REGISTER

(75) Inventor: William C. Moyer, Dripping Springs, TX (US)

(73) Assignee: Freescale Semiconductor, Inc., Austin, TX (US)

(*) Notice: Subject to any disclaimer, the term of this patent is extended or adjusted under 35 U.S.C. 154(b) by 0 days.

(21) Appl. No.: 09/490,132

(22) Filed: Jan. 24, 2000

(51) Int. Cl.[7] .............................................. G06F 13/26
(52) U.S. Cl. ...................... 710/264; 710/261; 710/262; 710/263
(58) Field of Search .............................. 710/260–266, 710/264, 282; 709/108; 714/34

(56) References Cited

U.S. PATENT DOCUMENTS

| | | | | |
|---|---|---|---|---|
| 5,057,997 A | * | 10/1991 | Chang et al. ............... | 709/108 |
| 5,459,872 A | | 10/1995 | Connell et al. ............. | 395/736 |
| 5,671,424 A | | 9/1997 | Wisor et al. ................ | 395/742 |
| 5,701,495 A | * | 12/1997 | Arndt et al. ................ | 710/263 |
| 5,937,199 A | * | 8/1999 | Temple ....................... | 710/262 |
| 5,987,601 A | * | 11/1999 | Donovan .................... | 712/244 |
| 6,185,629 B1 | * | 2/2001 | Simpson et al. ............ | 710/10 |
| 6,397,284 B1 | * | 5/2002 | Sleeman et al. ........... | 710/266 |
| 6,412,081 B1 | * | 6/2002 | Koscal et al. ............... | 714/34 |
| 6,625,149 B1 | * | 9/2003 | Brustoloni et al. ......... | 370/389 |
| 2001/0047470 A1 | * | 11/2001 | Roche ......................... | 712/244 |
| 2003/0037228 A1 | * | 2/2003 | Kelsey et al. ............... | 712/245 |

OTHER PUBLICATIONS

Motorola. M*CORE™, MMC2001 Reference Manual, Section 10, Interrupot Controller, pp. 10.1–10.6.

* cited by examiner

Primary Examiner—Gopal C. Ray
Assistant Examiner—Kim T. Huynh
(74) Attorney, Agent, or Firm—Robert L. King; Joanna G. Chiu

(57) ABSTRACT

A flexible interrupt controller (28) that includes an interrupt force register (120) is presented. Hardware interrupts (102) that are presently asserted by their respective hardware sources are stored in an interrupt source register (110) included in the interrupt controller (28). An independent interrupt force register (120) stores currently pending software interrupts (104) which may be asserted through the execution of software routines by the central processing unit (CPU) (12) within the data processing system (10). In one embodiment, each bit location in the interrupt source register (110) has a corresponding bit location in the interrupt force register (120), and each bit in the interrupt force register (120) is logically OR-ed with the corresponding bit in the interrupt source register (110). Results of the logical OR operation are stored in an interrupt pending register (160) and the contents of the interrupt pending register (160) is bit wise OR-ed together in order to generate an interrupt request signal (174) provided to the CPU (12).

19 Claims, 4 Drawing Sheets

FLEXIBLE INTERRUPT CONTROLLER THAT INCLUDES AN INTERRUPT FORCE REGISTER

RELATED APPLICATION

The present invention relates to a application entitled "Multifield Register Having a Selection Field for Selecting a Source of An Information Field" which was filed on Jun. 29, 1999 and has a Ser. No. of 09/342,519 and is assigned to the same assignee as the present application.

FIELD OF THE INVENTION

The present invention relates generally to interrupt controllers, and more particularly to an interrupt controller that includes an interrupt force register controlled by software.

BACKGROUND OF THE INVENTION

Interrupts are commonly used in computer systems to provide a mechanism to force software to alter its current execution and perform tasks that "service" the interrupt. For example, if there is incoming valid data on a serial data interface which is to be stored in a buffer, the serial data interface may assert an interrupt which, when serviced, causes the data to be captured and placed in the buffer. In many cases, the prioritization of the serving of interrupts is important as many interrupts relate to interrupt sources that have a limited tolerance for the latency associated with servicing of interrupts. For example, the data on the serial data interface may only be valid for a limited amount of time, thus requiring it to be captured within that time period. Servicing of interrupts is typically accomplished through the use of software routines commonly referred to as interrupt service routines or interrupt handlers.

A typical prior art interrupt controller module receives interrupt requests from multiple interrupt sources. The requests are stored in an interrupt source register having a bit corresponding to each of the interrupt sources such that the interrupt source register can be read to determine which sources are asserting pending interrupts. An interrupt enable register stores a bit corresponding to each of the potential pending interrupts such that individual bit masking of the interrupt source register is facilitated. A logical AND is performed on the interrupt source register and the content of the interrupt enable register in order to form the content of an interrupt pending register. Thus, if an interrupt is asserted and is enabled by the mask register, a logical one will be generated for that interrupt in the interrupt pending register. A logical bit-wise OR is performed on the interrupt pending register in order to generate an interrupt signal that is routed to the central processing unit (CPU). As such, any pending interrupts which are enabled will force assertion of the interrupt signal to the CPU.

When the CPU detects that the interrupt signal has been asserted, the interrupt pending register can be examined to determine which interrupt service routine should be executed in response. This may involve resolving interrupt prioritization, where the prioritization may be based on the bit location of a particular interrupt in the interrupt pending register. Thus, the more significant bits in the interrupt pending register may have higher priority than less significant bits. Because the interrupt source register and interrupt pending registers are read-only, such prior art interrupt controllers are limited in that software interrupt requests can only be generated by forcing hardware to assert an interrupt request.

Another prior art interrupt controller is described in U.S. Pat. No. 5,459,872 issued to Connell et al. (hereinafter "Connell"). Connell describes an interrupt controller that includes an interrupt register that stores pending interrupts corresponding to a plurality of hardware interrupt sources. Control software is also included which can cause interrupt requests to be asserted by modifying the interrupt register. Although the teachings of Connell allow software interrupts to be generated by modifying the hardware interrupt indications stored in the interrupt register, there is no way to distinguish between hardware and software generated interrupts by referencing the contents of the interrupt register. In addition, the number of different interrupt requests supportable by the interrupt controller as taught by Connell is limited to the number of hardware interrupt sources supported by the interrupt register.

Therefore, a need exists for an interrupt controller that allows hardware and software interrupts to be distinguished while providing for unified processing of both hardware and software interrupt requests.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Generally, the present invention provides a flexible interrupt controller that includes an interrupt force register. Hardware interrupts that are presently asserted by their respective hardware sources are stored in an interrupt source register included in the interrupt controller. An independent interrupt force register stores currently pending software interrupts which may be asserted through the execution of software routines by the central processing unit (CPU) within the data processing system. In one embodiment, each bit location in the interrupt source register has a corresponding bit location in the interrupt force register, and each bit in the interrupt force register is logically OR-ed with the corresponding bit in the interrupt source register. Results of the logical OR operation are stored in an interrupt pending register and the contents of the interrupt pending register is bit wise OR-ed together in order to generate an interrupt request signal provided to the CPU.

Figure 1:
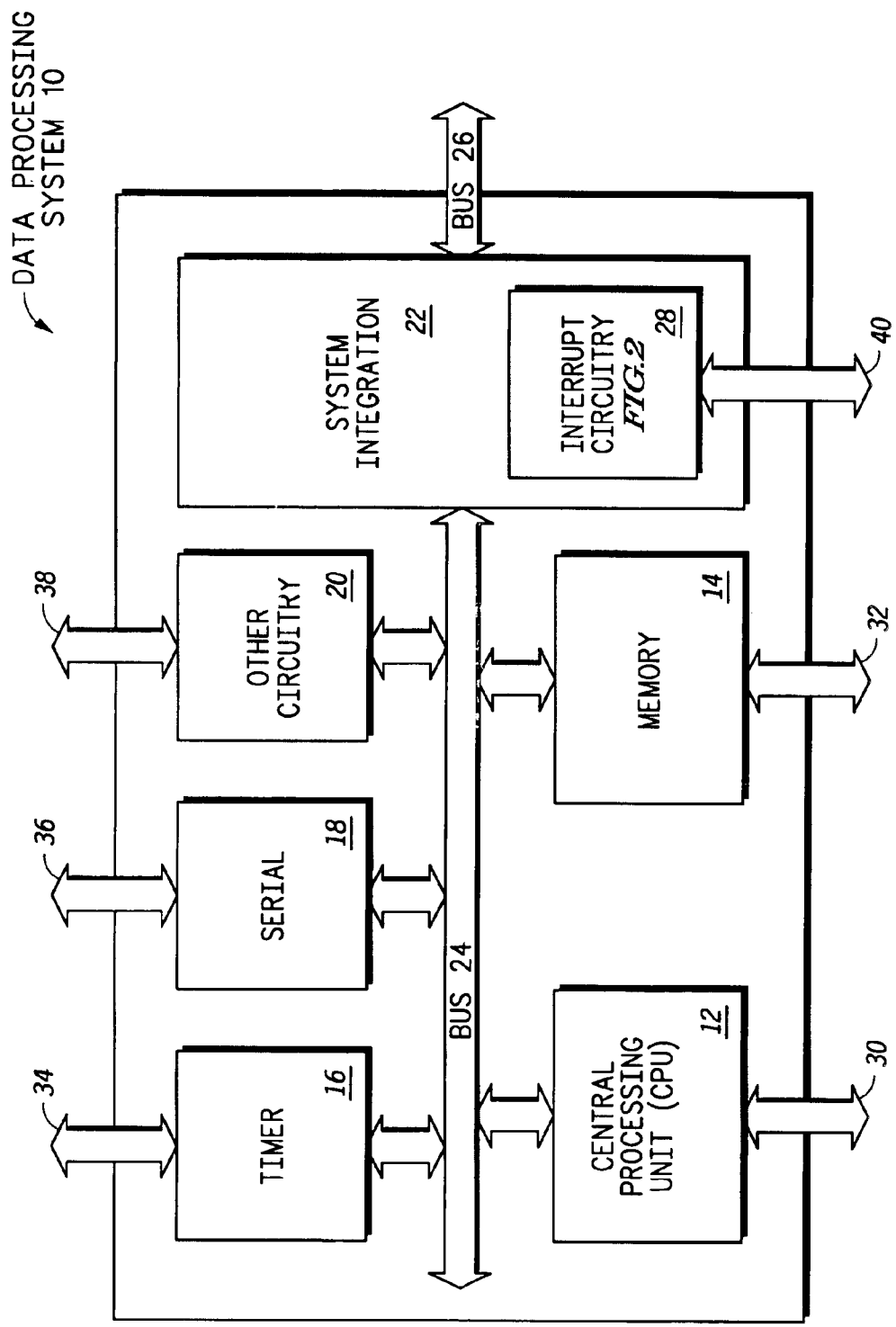
FIG. 1 illustrates a block diagram of a data processing system in accordance with a particular embodiment of the present invention.

The invention can be better understood with reference to FIGS. 1–6. FIG. 1 illustrates a data processing system 10 having central processing unit (CPU) circuitry 12, memory circuitry 14, timer circuitry 16, serial circuitry 18, other circuitry 20, and system integration circuitry 22, which are all bi-directionally coupled to each other by way of bus 24.

CPU 12 may be coupled external to data processing system 10 by way of one or more integrated circuit terminals 30. Memory 14 may be coupled external to data processing system 10 by way of one or more integrated circuit terminals 32. Timer 16 may be coupled external to data processing system 10 by way of one or more integrated circuit terminals 34. Serial circuitry 18 may be coupled external to data processing system 10 by way of one or more integrated circuit terminals 36. And, other circuitry 20 may be coupled external to data processing system 10 by way of one or more integrated circuit terminals 38. System integration circuitry 22 is bi-directionally coupled external to data processing system 10 by way of bus 26. System integration circuitry 22 includes interrupt circuitry 28. Interrupt circuitry 28 may be coupled external to data processing system 10 by way of integrated circuit terminals 40, and may be coupled to CPU 12 by way of bus 24.

In some embodiments of the present invention, data processing system 10 is a data processor which is formed on a single integrated circuit. In some embodiment, data processing system 10 is a single chip microcontroller. In alternate embodiments, data processing system 10 may be implemented using any type of electrical circuitry. Memory 14 may be any type of memory. Alternate embodiments of data processing system 10 may include more, fewer, or different blocks of circuitry. For example, alternate embodiments of data processing system 10 may not have memory 14, timer 16, serial 18, or other circuitry 20. Some embodiments of the present invention may include the interrupt circuitry 28 as part of CPU 12, and may or may not have system integration circuitry 22.

Integrated circuit terminals 30, 32, 34, 36, 38, and 40 may be any type of apparatus which allows electrical signals to be transferred to or from data processing system 10. For example, integrated circuit terminals 30, 32, 34, 36, 38, and 40 may be integrated circuit pins, solder bumps, wire conductors, etc. In addition, bus 26 may conduct electrical signals to and from data processing system 10 by way of integrated circuit terminals.

Figure 2:
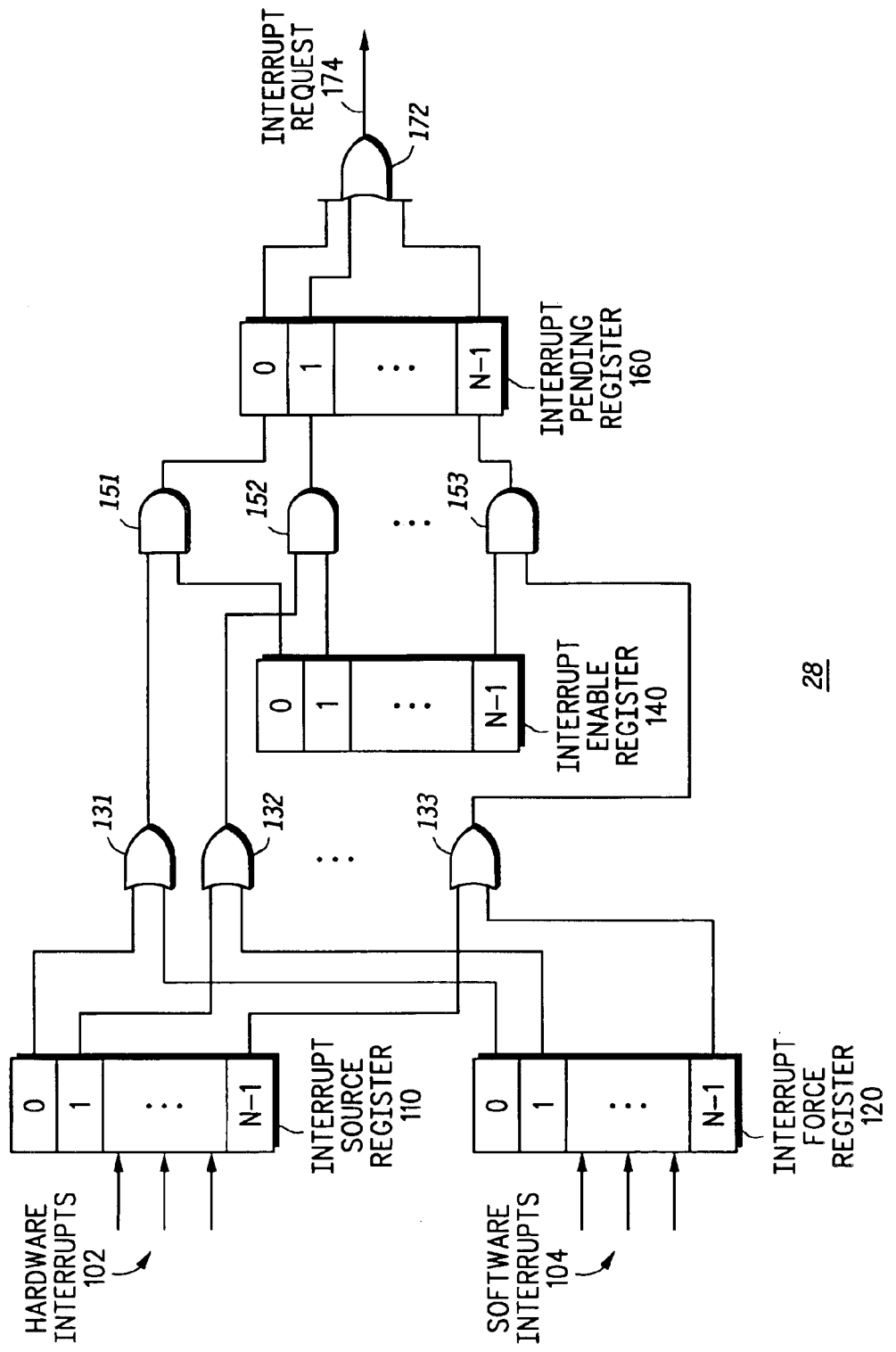
FIG. 2 illustrates a block diagram of a portion of the interrupt circuitry of FIG. 1 in accordance of a particular embodiment of the present invention.

FIG. 2 illustrates a portion of the interrupt circuitry 28 of FIG. 1 in accordance with one embodiment of the present invention. The interrupt circuitry 28 is shown to include an interrupt source register 110, an interrupt force register 120, an interrupt enable register 140, an interrupt pending register 160, and logic gates 131–133, 151–153, and 172. In one embodiment of the present invention, each of the interrupt source register 110, interrupt force register 120, interrupt enable register 140, and the interrupt pending register 160 may each include N bits, where N is an integer.

The interrupt source register 110 is a storage device that has a plurality of inputs which may correspond to hardware interrupts received by the data processing system 10. These hardware interrupts may be received via physical conductors such as the integrated circuit terminals 40 where each of the hardware interrupts 102 corresponds to a particular hardware-generated interrupt source. The interrupt source register 110 selectively stores the hardware interrupts received via the physical conductors and provides each of the hardware-generated interrupts at a predetermined output terminal.

The interrupt source register 110 may include a plurality of transparent latches where each transparent latch stores the value of one of the hardware interrupts 102 and allows for the values associated with the hardware interrupt lines 102 to be ascertained by reading the interrupt source register 110. Such transparent latches are useful in ensuring that changes on the hardware interrupts 102 propagate to additional circuitry within the interrupt circuitry 28 in a manner that does not violate timing constraints.

In other embodiments, the interrupt source register 110 includes an individual bit register such as a flip flop for each of the hardware interrupts 102. When a hardware interrupt source asserts an interrupt request, the bit within the interrupt source register 110 that corresponds to that particular interrupt request from that source is set. Preferably, the interrupt source register 100 is implemented as a read only register, and as such, software cannot force a particular bit within the interrupt source register 110 to a set or cleared state.

The interrupt force register 120 receives a plurality of software generated interrupt signals (software interrupts) 104 via one or more inputs. The software interrupts 104 each indicate an interrupt from a different source or of a different type than the hardware interrupts 102 such that at least one of the software-generated interrupts corresponds to a portion of the data processing system which is not designated as a hardware interrupt source. Software interrupts may be generated through the execution of software stored in the memory 14 by the CPU 12.

The interrupt force register 120 is a storage device that includes a bit location for each of the software interrupts 104. The storage device that makes up the interrupt force register 120 may include latches or registers as was the case with the interrupt source register 110. In order to enable software interrupts to be asserted by performing a write to the interrupt force register 120, the interrupt force register 120 may be configured as a read/write register.

The contents of the interrupt source register 110 and the interrupt force register 120 (hardware-generated interrupt signals and software-generated interrupt signals, respectively) are combined using logic circuitry to generate an interrupt request signal 174 that is provided to the CPU 12 to cause an interrupt to occur in the data processing system 10. In the embodiment illustrated in FIG. 2, a plurality of OR gates 131–133 are used to logically OR the value of a bit at a particular location in the interrupt source register 110 with the value of a corresponding bit in the interrupt force register 120. Thus, the OR gate 131 ORs the bit at the least significant bit location in interrupt source register 110 with the bit in the least significant location of the interrupt force register 120. It should be understood that the present invention may be implemented in other embodiments where the plurality of OR gates 131–133 are used to logically OR the value of a bit at a particular location in the interrupt source register 110 with values in the interrupt force register 120 which are not necessarily corresponding bits.

In an embodiment where the interrupts included in the data processing system are non-maskable, the outputs of the OR gates 131–133 may be provided directly to an interrupt pending register 160. However, in some embodiments, individual interrupts are maskable such that an interrupt enable register 140 (which may also be referred to as a mask register) and other enabling circuitry is used to enable or disable potential interrupts in the data processing system. Therefore, the outputs of the OR gates 131–133 are provided as inputs to a corresponding plurality of AND gates 151–153. The other input for each of the AND gates 151–153 is a bit value stored at a corresponding location in the interrupt enable register 140. The outputs of the AND gates 151–153 are then provided to the interrupt pending register 160. Thus, bits which are set within the interrupt enable register 140 allow pending interrupts to propagate or pass through to the interrupt pending register 160. The interrupt enable register 140 is preferably implemented as a read/write register within the data processing system. This allows for dynamic masking of each of the interrupts within the processing system.

The interrupt pending register 160, which may be a read only register, stores the resulting combination of the values in the interrupt source register 110, the interrupt force register 120, and the interrupt enable register 140. The values for each bit location within the interrupt pending register 160 are bit wise OR-ed together by the OR gate 172 to generate the interrupt request signal 174 provided to the CPU 12. Therefore, if any of the bits within the interrupt pending register 160 are set, the interrupt request signal 174 will be asserted.

Bit positions (storage locations) within the interrupt pending register 160 may be associated with a prioritization scheme such that interrupts indicated by set bits at more significant bit locations correspond to interrupts having higher priority than interrupts indicated by set bits at less significant bit locations in the interrupt pending register 160. For example, if the interrupt pending register 160 includes N bits, the bit location 0 may correspond to interrupts of the lowest priority, whereas bit location N-1 may correspond to interrupts having the highest priority. A find first bit set instruction can be used in conjunction with interrupt pending register 160 to determine a pending interrupt having the highest priority. Note that the assignment of an interrupt prioritization level to specific storage locations in the interrupt pending register implies that the bit position in the interrupt source register 110 and the interrupt force register 120 is directly related to such prioritization.

In one embodiment, the interrupt circuitry 28, as illustrated in FIG. 2, can be used to emulate the presence of hardware interrupts even when the sources associated with such hardware interrupts are not active or present in the system. This may be accomplished by using software to assert software interrupts having bit locations within the interrupt force register 120 that correspond to the locations of bits in the interrupt source register 110 for which the hardware interrupts to be emulated correspond.

Because the OR gates 131–133 combine the values stored in the interrupt source register 110 with the value stored in the interrupt force register 120, forcing a software interrupt at a particular bit location in the interrupt force register 120 will generate a positive output value on a particular one of the OR gates 131–133 in the same manner as a received hardware interrupt corresponding to the same bit location in the interrupt source register 110. Thus, a portion of the plurality of software-generated interrupt signals may be assigned priority levels such that they may be used to represent interrupts from some interrupt sources that generate hardware interrupts and have a corresponding prioritization level. Such emulation may be valuable in debugging operations where it is impractical to simulate the assertion of hardware interrupts through other means.

When the CPU 12 receives an interrupt request 174 generated by the interrupt circuitry 28, the first course of action is typically to read the interrupt pending register 160. The find first set bit function may then be used to determine the pending interrupt having the highest priority as indicated by the interrupt pending register 160, where the bit position determines the priority for each pending interrupt. The bit position of the highest priority interrupt is then used to determine a vector to be fetched corresponding to an interrupt service routine from a jump table. The vector that is fetched allows the CPU to execute the appropriate interrupt service routine, which is typically stored in memory 14. The execution of the interrupt service routine is performed in a manner such that upon completion, the state of the system may be changed so that the interrupt that triggered execution of the interrupt service routine will be deasserted.

In order to facilitate maintenance of the prioritization scheme described with respect to the servicing of interrupts by the CPU 12, interrupts having the same or lower priority as an interrupt currently being serviced are typically masked off (using the interrupt enable register 140) such that assertion of lower priority interrupts does not result in generation of an additional interrupt request to CPU 12. Such additional interrupt requests to the CPU 12 would result in the CPU 12 reading the interrupt pending register 160 and making a determination as to the priority of the newly received interrupts, which would degrade speed and efficiency of execution of the higher-priority interrupt service routine. However, if a higher-priority interrupt is received (which would not be masked off), the CPU may switch to servicing the higher priority interrupt while delaying completion of the servicing of the interrupt that had been being serviced.

Figure 3:
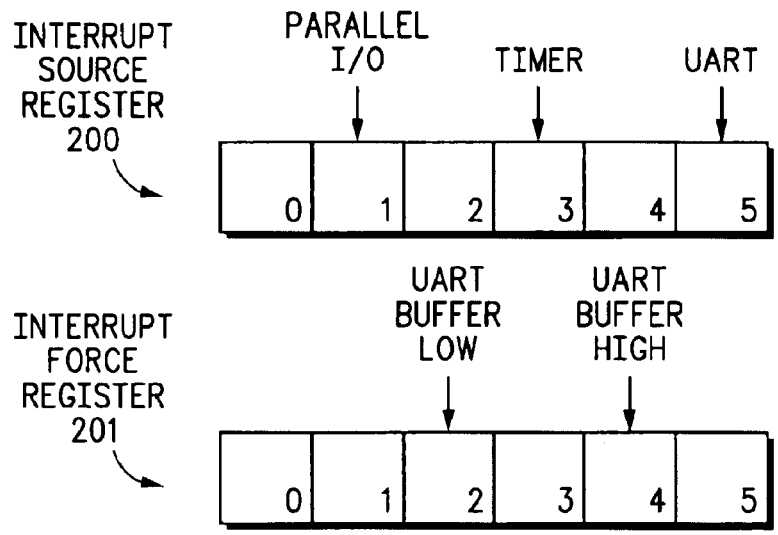
FIG. 3 illustrates a block diagram of an interrupt source register and an interrupt force register in accordance with a particular embodiment of the present invention.
Figure 4:
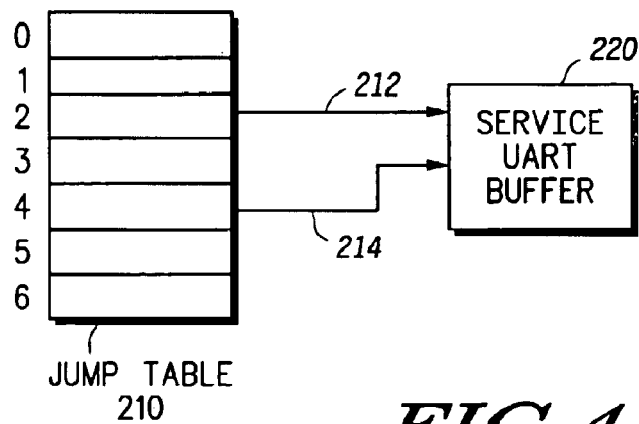
FIG. 4 illustrates a block diagram of a jump table and associated pointers in accordance with a particular embodiment of the present invention.

FIG. 3 illustrates examples of an interrupt source register 200 and an interrupt force register 201 which may be used to aid and understanding some of the teachings of the present invention. The interrupt source register 200 is shown to include six bits (positions 0–5). Bit positions 1, 3, and 5 of the interrupt source register 200 are shown to correspond to particular hardware interrupts. Bit position 1 corresponds to a parallel input/output (I/O) interrupt, bit position 3 corresponds to a timer interrupt, and bit position 5 is shown to correspond to a universal asynchronous receiver-transmitter (UART) serial communication port. In the example interrupt source register 200 shown in FIG. 3, the UART is assumed to have the highest priority with respect to interrupt servicing. Therefore, the parallel I/O interrupt has the lowest priority level.

Servicing of the UART interrupt may result in data on the UART serial interface being captured and stored in a buffer within the processing system. In some cases, backend processing such as decompression of the UART data may be required in response to storage of that data in the buffer. In order to facilitate such backend processing, software may assert a software interrupt indicating that such decompression of data stored in the buffer is required.

In normal operation, when the data placed in the buffer through servicing of the UART interrupt is decompressed at a rate that ensures the buffer is not filled above a threshold level, the priority of the software interrupt corresponding to requests for processing of the buffered UART data may be of a generally low priority. This is illustrated with respect to the interrupt force register 201 of FIG. 3 where the UART buffer low priority indication is shown to correspond to the bit location 2 within the interrupt force register 201. When software interrupts of this priority level are used to request servicing of the UART buffer, such servicing will be conditioned on the absence of interrupts having a higher priority. One such higher-priority interrupt is the hardware timer interrupt. The hardware timer interrupt has a priority level of 3, which is a higher priority then the level 2 priority of the UART buffer low priority interrupt requests.

In some cases, the CPU may detect that the servicing of the UART buffer should be elevated to a higher priority. This may occur if servicing of the UART hardware interrupt dumps a significant amount of data into the UART buffer and processing of higher priority interrupts, such as those issued by the timer, present the danger of the UART buffer overflowing.

In order to avoid data loss, the priority of servicing of the UART buffer may be elevated to a higher priority such as that indicated by the UART buffer high priority indication in the interrupt force register 201. The UART buffer high indication corresponds to a priority level of 4, which is a higher priority than that of the timer in the interrupt source register 200. As such, if interrupts are pending for both the timer and servicing of the UART buffer at the higher priority level, the UART buffer will be preferentially serviced.

The CPU can make the determination as to if the contents of the UART buffer require an upgrade in terms of prioritization. In order to facilitate servicing of the UART buffer based on interrupts at either of the UART buffer low or UART buffer high prioritization levels, the jump table 210 illustrated in FIG. 4 may be utilized. The jump table 210 stores a pointer 212 corresponding to level 2 priority interrupts. The pointer 212 points to an interrupt service routine 220 that causes the UART buffer to be serviced. Similarly, the jump table 210 stores a pointer 214 corresponding to level 4 priority interrupts. The pointer 214 also points to the interrupt service routine, 220 that causes the UART buffer to be serviced.

When the CPU 12 receives an interrupt request 174, it reads the interrupt pending register 160 to ascertain the current highest priority pending interrupt. If this current highest priority pending interrupt is a level 2 or level 4 priority interrupt, the jump table 210 will be referenced to obtain a pointer to the interrupt service routine 220 such that the UART buffer will be serviced. Note that the jump table 210 also stores pointers at the respective priority levels corresponding to the hardware interrupts described with respect to the interrupt source register 200.

Figure 5:
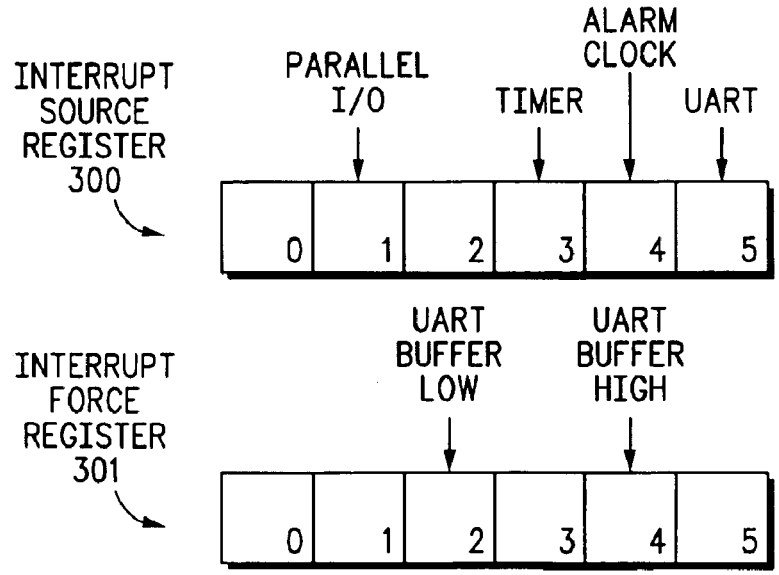
FIG. 5 illustrates another interrupt source register and interrupt force register in accordance with another embodiment of the present invention.

FIG. 5 illustrates an interrupt source register 300 and an interrupt force register 301 corresponding to a scenario similar to that described with respect to FIG. 3. In the example associated with FIG. 5, an additional hardware interrupt corresponding an alarm clock is shown to be associated with the interrupt source register 300 such that the alarm clock has an interrupt priority level of 4. As is illustrated with respect to the interrupt force register 301, the UART buffer may normally be serviced based on the UART buffer low priority level, which is of level 2 priority. If the CPU determines that the UART buffer is being inadequately serviced and needs to have a higher priority level associated with it in order to increase its servicing level, a software interrupt corresponding to the UART buffer high priority level may be asserted rather than the normal UART buffer low priority interrupt. However, it should be apparent that the UART buffer high priority interrupt has the same priority as the hardware interrupt corresponding to the alarm clock. Both are level 4 priority interrupts.

Figure 6:
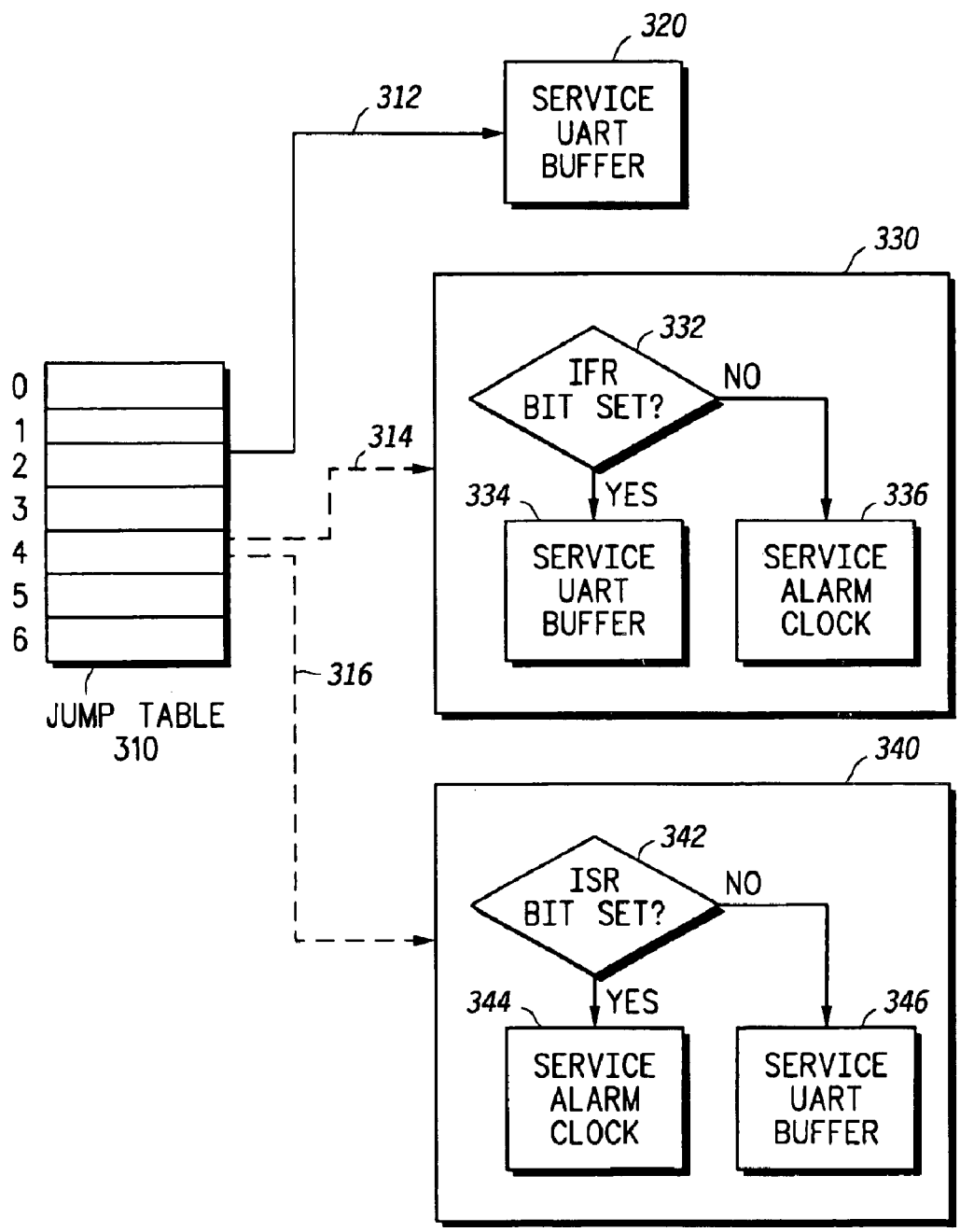
FIG. 6 illustrates a block diagram of another jump table and associated pointers in accordance with another embodiment of the present invention.

In order to allow the CPU to execute the appropriate interrupt service routine in response to a level 4 interrupt, the jump table 310 illustrated in FIG. 6 may include a pointer 314 to an interrupt service routine 330 that includes additional decision making. The interrupt service routine 330 includes a decision step 332 that reads the interrupt force register (IFR) 301 to determine if the level 4 priority bit within the interrupt force register 301 is set. If it determines that the bit corresponding to the level 4 priority is set within the interrupt force register 301, it proceeds to step 334 where the UART buffer is serviced.

If it is determined that the level 4 priority bit within the interrupt force register 301 is not set, the level 4 priority interrupt must have been caused by an interrupt assertion by the alarm clock as a level 4 priority interrupt results from the logical ORing of the level 4 priority bits of the interrupt source register 300 and the interrupt force register 301. As a result of determining that the level 4 priority bit in the interrupt force register 301 is not set, thus indicating that the alarm clock has asserted an interrupt, the interrupt service routine will perform step 336 such that the alarm clock is serviced.

Note that the interrupt service routine 330 corresponding to the pointer 314 inherently prioritizes the level 4 priority interrupt of the interrupt force register 301 that corresponds to a software interrupt over the level 4 priority interrupt of the interrupt source register 300 that corresponds to a hardware interrupt from the alarm clock. This is due to the fact that the interrupt service routine 330 determines which interrupt is to be serviced based on an inspection of the interrupt force register 301. If both the alarm clock hardware interrupt and a UART buffer high priority software interrupt were pending simultaneously, inspection of the interrupt force register 301 would reveal that the UART buffer high priority software interrupt was pending and the interrupt service routine 330 would therefore proceed to step 334 and service that UART buffer. Thus, even though the alarm clock is shown to have an equivalent priority level as the UART buffer high priority software interrupt, the interrupt service routine 330 gives additional priority to the UART buffer high priority software interrupt through its execution of the decision step 332.

An alternative interrupt service routine 340 would provide a similar result as the interrupt service routine 330 with the exception that the inherent prioritization of the decision making step in the interrupt service routine 340 favors the hardware interrupt corresponding to the alarm clock. The jump table 310 may store a pointer 314 to the interrupt service routine 330 that favors the software interrupt, or may store the pointer 316 that favors the hardware interrupt.

The interrupt service routine 340 begins by reading the interrupt source register 300 and determining if the level 4 priority bit in the interrupt source register 300 corresponding to the alarm clock hardware interrupt is set. If the level 4 priority bit in the interrupt source register 300 is not set, the CPU deduces that the level 4 priority bit within the interrupt force register 301 must be set and therefore the UART buffer is serviced at step 346. If it is determined that the level 4 priority bit within the interrupt source register 300 is set, the alarm clock is serviced at step 344.

Note that the jump table 310 stores a pointer 312 corresponding to the level 2 priority interrupts that points to an interrupt service routine 320. The interrupt service routine 320 causes the UART buffer to be serviced. No decision making is required in executing the interrupt service routine 320 because there is only one level 2 priority interrupt which can occur within the system. This is the UART buffer low priority software interrupt. The interrupt source register 300 is shown to lack a hardware interrupt that corresponds to its level 2 priority bit location.

The interrupt circuitry 28 illustrated in FIG. 2 allows for both hardware and software interrupts of a similar priority level to coexist in the data processing system. This effectively doubles the number of potential interrupts that are supported by an interrupt pending register in comparison to prior art interrupt handlers. Thus, the interrupt pending register may include N bit locations corresponding to N priority levels, where a set value at any one of those bit locations can correspond to a hardware interrupt of that priority level or a software interrupt of that priority level. In order to ascertain whether the value in the interrupt pending register 160 is due to a software-generated interrupt or a hardware-generated interrupt, one or more of the interrupt source register 110 and the interrupt force register 120 can be consulted.

Because the hardware interrupts received by the interrupt source register 110 are based on signals received over physical conductors coupled to the interrupt source register 110, the interrupt prioritization levels of the interrupts received over those physical conductors is permanently assigned or fixed based on the particular bit location to which a physical conductor corresponds. However, the prioritization levels associated with the software interrupts provided to the interrupt force register 120 can be varied based on software control.

As described with respect to the example above, control of the priority level of software interrupts is accomplished by modifying the jump table such that when a software interrupt of a particular priority level is detected, the jump table will direct the interrupt service routine corresponding to that particular software interrupt to be executed. Thus, a software interrupt corresponding to servicing of a UART buffer may initially be at a priority level of 2 such that the jump table stores an indication that a level 2 priority software interrupt should cause the UART buffer to be serviced. If it is later determined by the CPU that the UART buffer should be serviced with a higher interrupt prioritization level, future UART buffer software interrupts may be asserted by setting a bit in the interrupt force register having a higher priority than priority level 2. In order to ensure that the higher priority software interrupt produces the desired servicing of the UART buffer, the jump table should be configured such that software interrupts corresponding to the higher priority level result in the execution of the interrupt service routine that services the UART buffer.

In another example application that utilizes the flexibility of the interrupt circuitry 28 of FIG. 2 to adapt interrupt priority levels to the needs of the data processing system, the effective priority level of received hardware interrupts can be altered. For example, if a low priority hardware interrupt is received that the CPU determines should be serviced without interruption by subsequently received interrupts of a higher priority, the CPU can assert a software interrupt of a higher priority level. The higher priority software interrupt may trigger, based on the configuration of the jump table, execution an interrupt service routine similar to that of the low priority hardware interrupt. While the high priority software interrupt is being serviced, lower priority interrupts will be masked off, thus ensuring that execution of the interrupt service routine originally specified by the low priority hardware interrupt is not interrupted.

Similarly, priority of execution of the interrupt service routine for a hardware interrupt received can be effectively decreased. This may be accomplished by asserting a lower priority software interrupt in response to receipt of a high priority hardware interrupt. While the lower priority software interrupt is asserted, the interrupt enable register 140 can be used to mask off the priority level corresponding to the higher priority level hardware interrupt whose effective priority is being modified. As such, the pending hardware interrupt will be ignored by the CPU and the lower level software interrupt which was generated in response to the original receipt of the higher level hardware interrupt will be serviced based on its lower priority level.

The dynamic changing of prioritization of servicing of interrupts in the data processing system as described directly above may allow the data processing system to adapt in a flexible manner to improve its overall performance. By utilizing the masking function of the enable register along with the software configurability of the jump table and the interrupt force register, a variety of priority modifications are possible that were not in prior art systems.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for implementing interrupts in a data processing system, comprising the steps of:

providing a first storage device having a plurality of inputs, each of the plurality of inputs being coupled by a respective physical conductor to one of a plurality of hardware-generated interrupt sources which selectively generate hardware interrupts and selectively storing the hardware interrupts, the first storage device providing one or more hardware-generated interrupt signals;

providing a second storage device having one or more inputs, each of the one or more inputs receiving and storing a predetermined one of a plurality of software-generated interrupt signals, at least some of the predetermined plurality of software-generated interrupt signals indicating an interrupt from a different source or of a different type than the hardware interrupts, the second storage device providing one or more software-generated interrupt signals;

coupling logic circuitry to the first storage device and the second storage device for receiving the one or more hardware-generated interrupt signals and the one or more software-generated signals, the logic circuitry providing an interrupt request signal which will cause an interrupt to occur in the data processing system;

wherein the interrupt prioritization level is assigned to specific storage locations of the first and second storage device, the interrupt prioritization level of the plurality of hardware-generated interrupt sources coupled to the first storage device being permanently assigned, but assignment of the interrupt prioritization level of interrupt sources associated with the second storage device being variable by software control.

2. The method of claim 1 further comprising the step of:

determining priority between two interrupts, a first interrupt being hardware-generated and a second interrupt being software-generated, when the two interrupts have a same prioritization level by choosing to service one of the hardware-generated first interrupt or the software-generated second interrupt.

3. The method of claim 1 further comprising the step of:

assigning a portion of the plurality of software-generated interrupt signals stored in the second storage device to represent interrupts from some interrupt sources generating hardware interrupts and having a corresponding interrupt prioritization level.

4. The method of claim 1 further comprising the step of:

assigning a portion of the plurality of software-generated interrupt signals stored in the second storage device to represent interrupts from some interrupt sources generating hardware interrupts and having an interrupt prioritization level which differs from the interrupt prioritization level of the plurality of hardware-generated interrupt sources coupled to the first storage device.

5. The method of claim 1 further comprising the step of:

changing interrupt servicing from servicing a hardware-generated interrupt and switching to servicing a software-generated interrupt of higher prioritization before completion of servicing of the hardware-generated interrupt occurs.

6. The method of claim 1 further comprising the step of:

assigning an interrupt prioritization level of a plurality of storage locations of the first storage device and to each of a plurality of storage locations of the second storage device.

7. The method of claim 1 further comprising:

coupling enabling circuitry between the first and second storage devices and the logic circuitry, the enabling circuitry receiving the hardware-generated and software-generated interrupts and determining whether to pass the hardware-generated and software-generated interrupts to the logic circuitry for further processing.

8. A data processing system with interrupt control circuitry, comprising:

a plurality of hardware interrupt sources;

a hardware interrupt storage device having a plurality of inputs, each of the plurality of inputs being coupled by an electrical conductor to one of a plurality of hardware interrupt sources, the hardware interrupt storage device storing hardware-generated interrupts and providing each of the hardware-generated interrupts at a predetermined output terminal;

a software interrupt storage device having a plurality of inputs, each of the plurality of inputs receiving a predetermined one of a plurality of software-generated interrupt signals, at least one of the software-generated interrupt signals corresponding to interrupt servicing of a portion of the data processing system which is not designated as a hardware interrupt source; and logic circuitry coupled to the hardware interrupt storage device and the software interrupt storage device for providing a data processing system interrupt signal in response to receipt of either hardware-generated interrupts or software-generated interrupts, wherein the logic circuitry determines priority between two interrupts, a first interrupt being hardware-generated and a second interrupt being software generated, when the two interrupts have a same prioritization level by choosing to service one of the hardware-generated first interrupt or the software-generated second interrupt, wherein the hardware interrupt storage device and the software interrupt storage device have an assigned interrupt prioritization level to specific storage locations, the interrupt prioritization level of the hardware interrupt sources being permanently assigned, but assignment of the interrupt prioritization level of interrupt sources associated with the software-generated interrupt signals being variable by software control.

9. The data processing system of claim 8 wherein a software-generated interrupt signal of higher priority than a currently executing hardware-generated interrupt signal is provided to the logic circuitry prior to completion of an associated hardware interrupt servicing, and the data processing system suspends processing of the hardware interrupt servicing to process an associated software interrupt servicing.

10. The data processing system of claim 8 further comprising:

a mask register coupled to the hardware interrupt storage device and the software interrupt storage device for selectivity preventing hardware-generated interrupt signals and software generated interrupt signals from propagating to the logic circuitry.

11. The data processing system of claim 8 wherein the hardware interrupt storage device and the software interrupt storage device are each implemented as latch circuits.

12. A method for implementing interrupts in a data processing system, comprising the steps of:

providing a first storage device having a first plurality of prioritized storage locations representative of priority of interrupt servicing for hardware interrupt signals stored therein, the first storage device having a plurality of inputs, each of the plurality of inputs being coupled by a physical conductor to a plurality of hardware-generated interrupt sources which selectively generate hardware interrupts and storing the hardware interrupts, the first storage device providing one or more hardware-generated interrupt signals;

providing a second storage device having a second plurality of prioritized storage locations representative of priority of interrupt servicing for software-generated interrupt signals stored therein, the second storage device having one or more inputs, each of the one or more inputs receiving and storing a predetermined one of a plurality of software-generated interrupt signals, the predetermined plurality of software-generated interrupt signals indicating an interrupt from a different source or of a different type than the hardware interrupts, the second storage device providing one or more software-generated interrupt signals;

executing software with the data processing system to generate a predetermined software-generated interrupt signal which emulates a predetermined one of the hardware-generated interrupt sources but with a priority which differs from the predetermined one of the hardware-generated interrupt sources, thereby dynamically changing prioritization of servicing of interrupts in the data processing system; and coupling logic circuitry to the first storage device and the second storage device for receiving the one or more hardware-generated interrupt signals and the one or more software-generated signals, the logic circuitry providing an interrupt request signal which will cause an interrupt to occur in the data processing system.

13. The method of claim 12 further comprising the steps of:

generating the predetermined software-generated interrupt signal which emulates the predetermined one of the hardware-generated interrupt sources while another hardware-generated interrupt is being serviced, the predetermined software-generated interrupt signal having a priority which is higher than the other hardware-generated interrupt being serviced; and suspending servicing of the other hardware-generated interrupt being serviced to begin servicing of the predetermined software-generated interrupt signal.

14. The method of claim 12 further comprising the step of:

masking the one or more hardware-generated interrupt signals and the one or more software-generated interrupt signals to selectively pass active interrupt signals to the logic circuitry in response to an enable signal.

15. A method for implementing interrupts in a data processing system comprising the steps of:

providing a first storage device having a plurality of inputs, each of the plurality of inputs being coupled by a respective physical conductor to one of a plurality of hardware-generated interrupt sources which selectively generate hardware interrupts and selectively storing the hardware interrupts, the first storage device providing one or more hardware-generated interrupt signals;

providing a second storage device having one or more inputs, each of the one or more inputs receiving and storing a predetermined one of a plurality of software-generated interrupt signals, at least some of the predetermined plurality or software-generated interrupt signals indicating an interrupt from a different source or of a different type than the hardware interrupts, the second storage device providing one or more software-generated interrupt signals;

coupling logic circuitry to the first storage device and the second storage device for receiving the one or more hardware-generated interrupt signals and the one or more software-generated signals, the logic circuitry providing an interrupt request signal which will cause an interrupt to occur in the data processing system; and changing prioritization level of a predetermined hardware-generated interrupt by providing a software-generated interrupt which represents a corresponding hardware-generated interrupt source for the predetermined hardware-generated interrupt but with a different prioritization level than the predetermined hardware-generated interrupt.

16. The method of claim 15 further comprising:

determining priority between two interrupts, a first interrupt being hardware-generated and a second interrupt being software-generated, when the two interrupts have a same prioritization level by choosing to service one of the hardware-generated first interrupt or the software-generated second interrupt.

17. The method of claim 15 further comprising the step of:

assigning a portion of the plurality of software-generated interrupt signals stored in the second storage device to represent interrupts from some interrupt sources generating hardware interrupts and having a corresponding interrupt prioritization level.

18. The method of claim 15 further comprising the step of:

assigning a portion of the plurality of software-generated interrupt signals stored in the second storage device to represent interrupts from some interrupt sources generating hardware interrupts and having an interrupt prioritization level which differs from the interrupt prioritization level of the plurality or hardware-generated interrupt sources coupled to the first storage device.

19. The method of claim 15 further comprising die step of:

changing interrupt servicing from servicing a hardware-generated interrupt and switching to servicing a software-generated interrupt of higher prioritization before completion of servicing of the hardware-generated interrupt occurs.

* * * * *

UNITED STATES PATENT AND TRADEMARK OFFICE
CERTIFICATE OF CORRECTION

PATENT NO. : 6,845,419 B2  Page 1 of 1
APPLICATION NO. : 09/490132
DATED : January 24, 2000
INVENTOR(S) : William C. Moyer It is certified that error appears in the above-identified patent and that said Letters Patent is hereby corrected as shown below:

In Column 11, Line 32, Claim No. 6:
Change "level of a plurality" to --level to each of a plurality--

In Column 14, Line 33, Claim No. 19:
Change "die" to --the--

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 6,845,419 B2
APPLICATION NO. : 09/490132
DATED : January 18, 2005
INVENTOR(S) : William C. Moyer It is certified that error appears in the above-identified patent and that said Letters Patent is hereby corrected as shown below:

In Column 11, Line 32, Claim No. 6:
    Change "level of a plurality" to --level to each of a plurality--

In Column 14, Line 33, Claim No. 19:
    Change "die" to --the--

This certificate supersedes the Certificate of Correction issued May 20, 2008.

Signed and Sealed this

Seventeenth Day of June, 2008

JON W. DUDAS
*Director of the United States Patent and Trademark Office*